United States Patent [19]

Cooper et al.

[11] 4,208,087
[45] Jun. 17, 1980

[54] OPTICAL FLEXURE JOINT

[75] Inventors: Erwin E. Cooper, Carrollton; Samuel R. McKenney, Dallas, both of Tex.

[73] Assignee: Texas Instruments Incorporated, Dallas, Tex.

[21] Appl. No.: 946,247

[22] Filed: Sep. 27, 1978

[51] Int. Cl.² ............................................. G02B 23/02
[52] U.S. Cl. ....................................... 350/16; 350/52
[58] Field of Search ................ 350/16, 52, 50, 21–24, 350/247; 354/70

[56] References Cited
U.S. PATENT DOCUMENTS

| | | | |
|---|---|---|---|
| 3,378,326 | 4/1968 | Alvarez | 350/16 |
| 3,582,180 | 6/1971 | Gross | 350/16 |

FOREIGN PATENT DOCUMENTS 1150699  4/1969  United Kingdom ...................... 350/16

*Primary Examiner*—Jon W. Henry
*Attorney, Agent, or Firm*—James T. Comfort; Richard Donaldson; Alva H. Bandy

[57] ABSTRACT

An optical flexure joint comprises first and second gimbal mounted lens doublets. The first doublet has a positive surface and the second a negative surface. Each lens doublet consists of two common glasses having index of refractions between about 1.4 and 1.9 that produce the same power as if they were a single lens having an index of refraction of 2.0. The first and second doublets when mounted with the positive and negative surfaces mating and the first doublet rotated with respect to the second form a wedge which has an optical deviation equal to the wedge angle; thus the optical flexure joint allows a small rotary motion to occur in an optical system perpendicular to the optical axis without any perceptable image motion.

3 Claims, 5 Drawing Figures

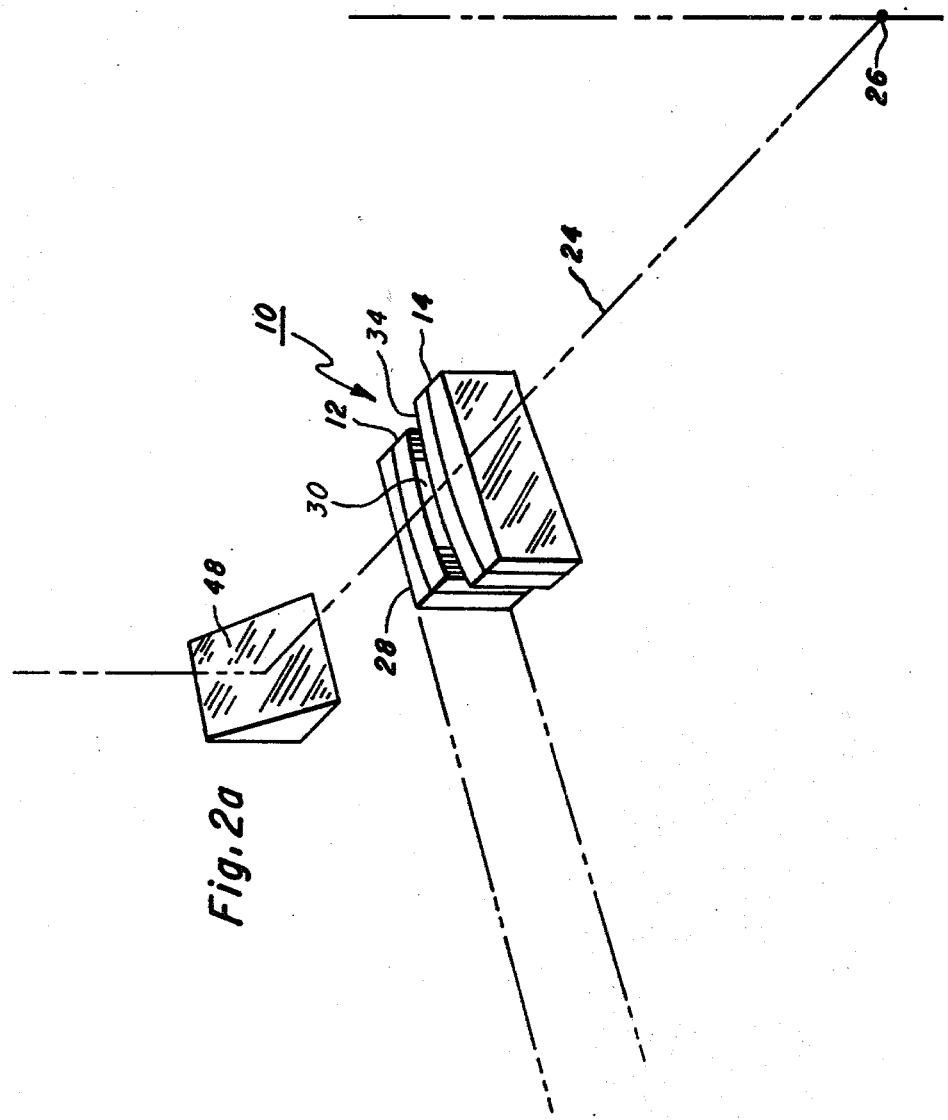

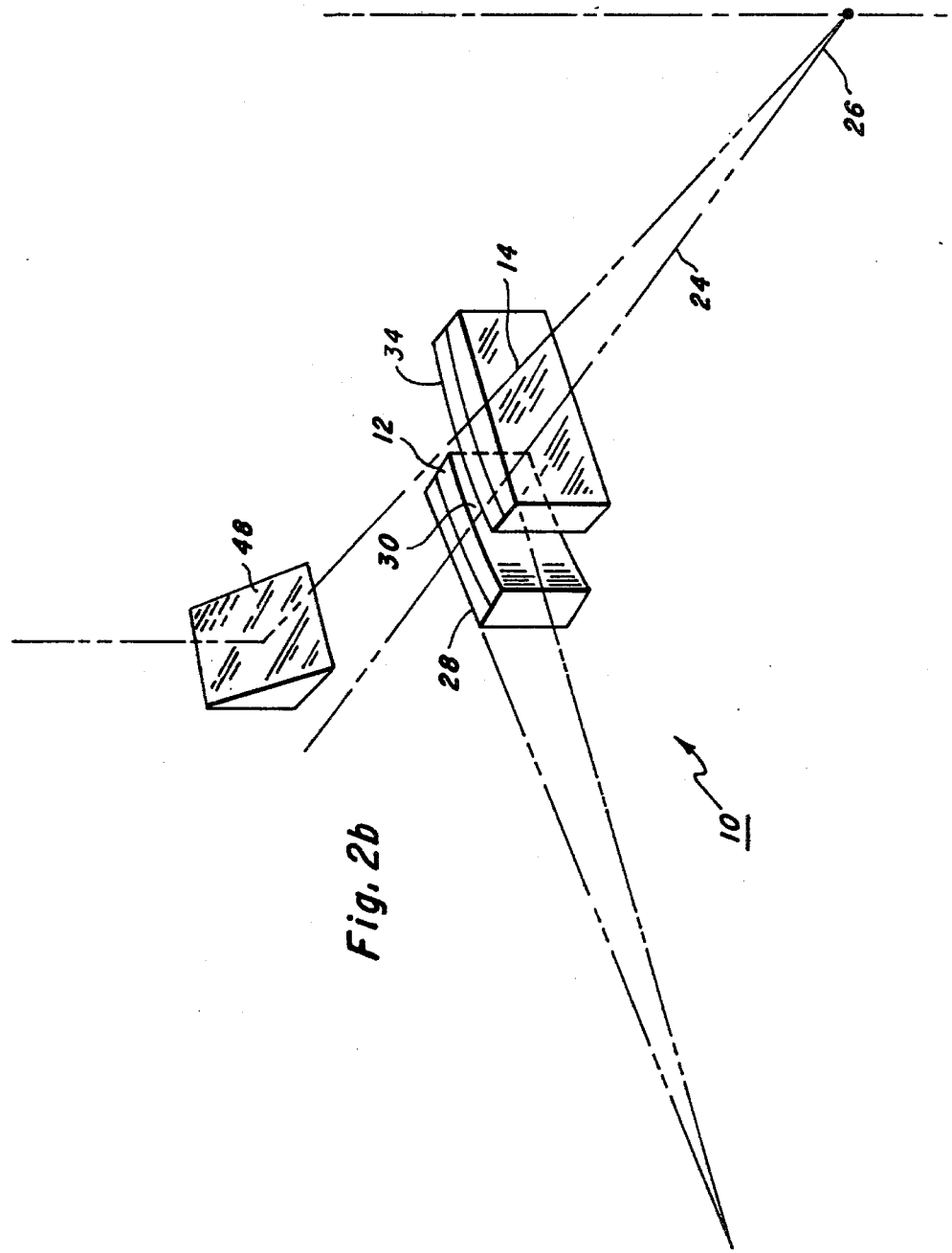

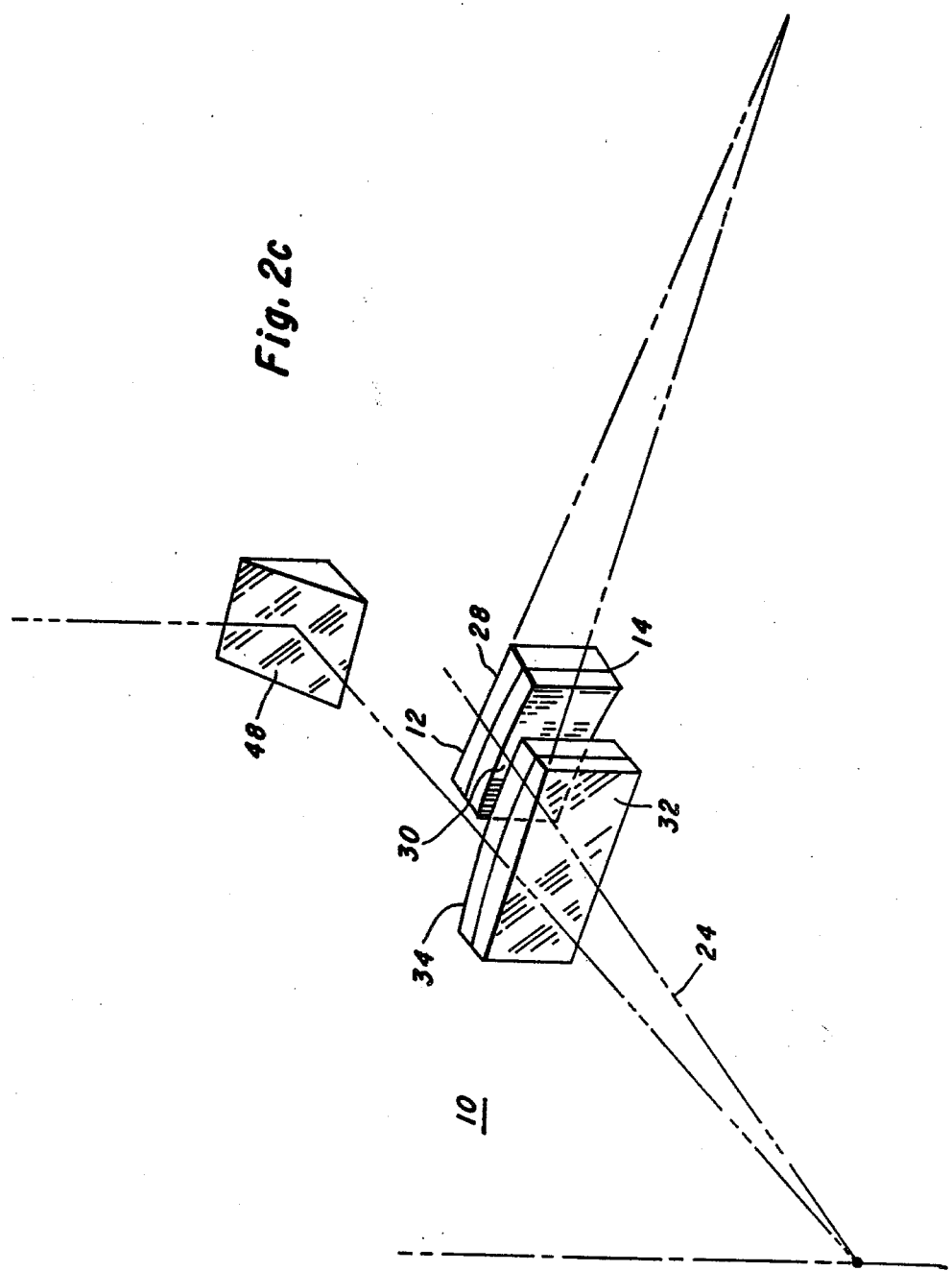

OPTICAL FLEXURE JOINT

This invention relates to optical devices, and more particularly to an optical flexure joint.

Figure 1:
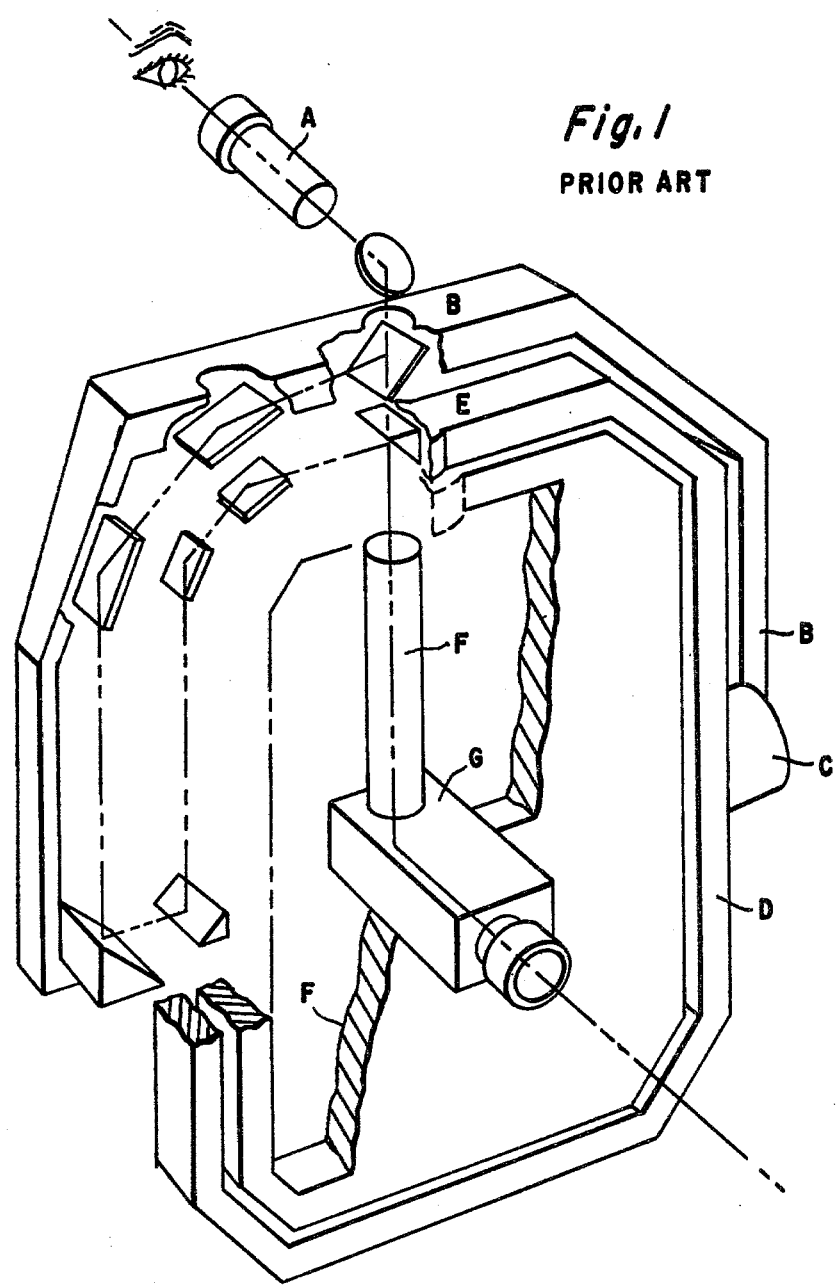

In the past gimbal mounted optical devices such as direct viewing telescopes had optical paths such as that shown in the prior art gimbal of FIG. 1. As shown the optical path proceeds from an eye piece A through the azimuth gimbal B, pivot C interconnecting the azimuth gimbal to the elevation gimbal, the elevation gimbal D, pivot E interconnecting the elevation gimbal to the cross-elevation gimbal, and the cross-elevation gimbal F to the gimbal mounted telescope G. The disadvantages of the prior art system are: the optical image moves proportionally to the rotary motions of the optical device, the optical path is a lengthy path and includes a complex relay system of mirrors and lenses to relay the image through the gimbal arrangement.

Accordingly, it is an object of this invention to reduce substantially image motion attending small rotary motions of an optical system.

Another object of the invention is to reduce substantially the optical path through gimbals of a gimbaled optical device.

Yet another object of the invention is to reduce to a minimium the optical relay elements in an optical relay.

Briefly stated the invention comprises an optical flexure joint or coupler which provides a means of routing a direct view optical path across adjacent mechanical parts having independent movement such as, for example, a gimbal mounted optical device. The optical device may be, for example, a telescope and with the optical flexure joint the optical path is directly across a pair of gimbals. The optical flexure joint comprises a positive and negative lens doublet which coact to bend the optical path through an angle exactly equal to the angle of rotation between adjacent gimbals in which the lens doublets are mounted. As a result, the optical flexure joint acts like an optical fiber rope lying across the gimbals, which allows the user a motionless view through the gimbal mounted telescope during gimbal movement. For a three axes gimbal, which includes an azimuth gimbal, elevation gimbal, and cross-elevation gimbal, the optical flexure joint provides an optical path across the elevation and cross-elevation gimbals. The lens doublets act as a variable wedge. One lens doublet of the wedge is mounted in the cross-elevation gimbal and the other lens doublet in the elevation gimbal. The wedge is designed to have an optical deviation exactly equal to the wedge angle. Since the wedge angle is formed by rotation of the cross-elevation axis, the direction of the optical path will be exactly equal to the gimbal rotation angle.

The novel features believed to be characteristic of this invention are set forth in the appended claims.

Figure 3:
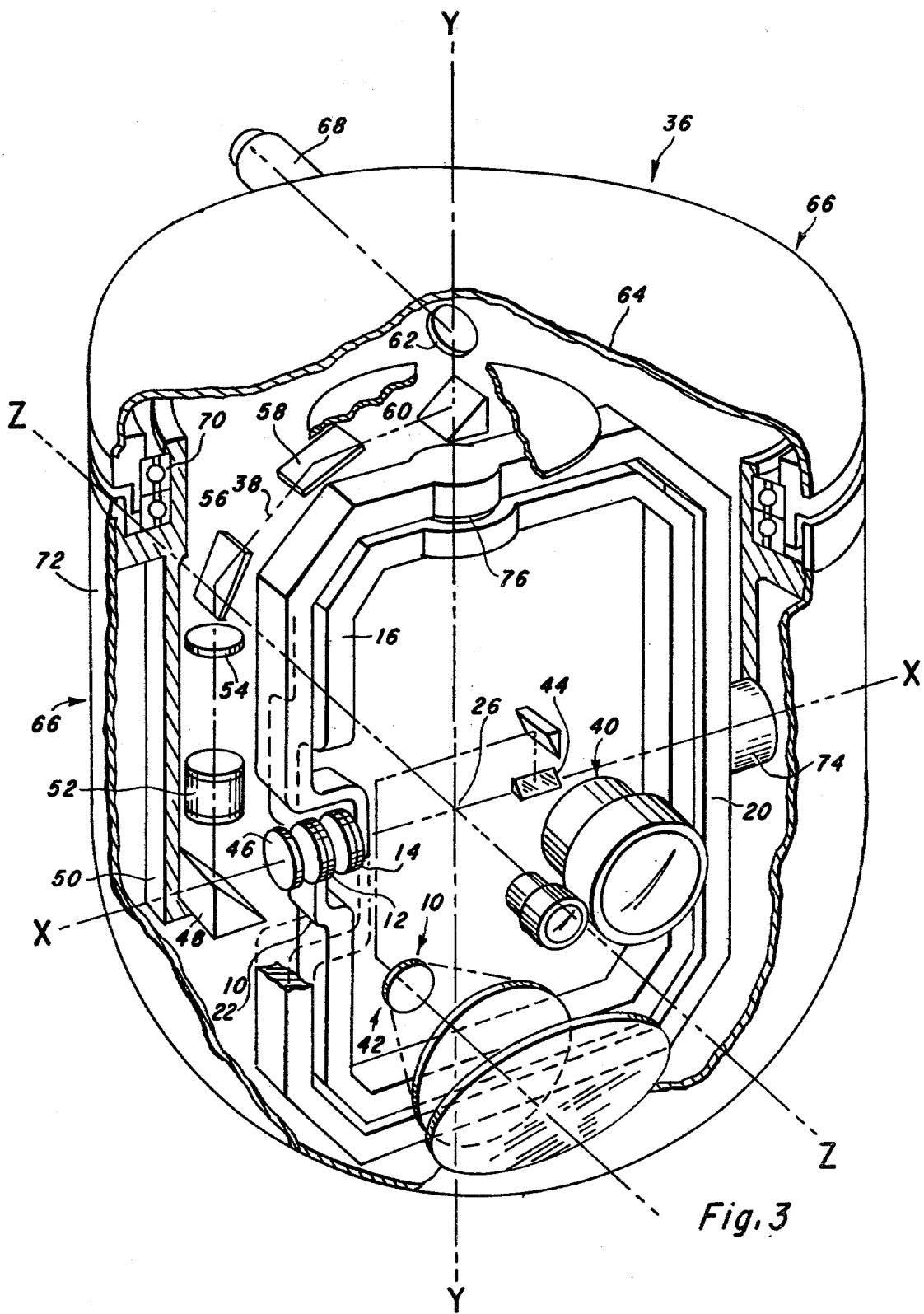

The invention itself, however, as well as other objects and advantages thereof may best be understood by reference to the following detailed description of an illustrious embodiment when read in conjunction with the accompanying drawings in which:

FIG. 1 is an isometric view of a prior art gimbal mounted direct viewing telescope with portions broken away to show the optical path crossings at each of the axes of rotation of a three axes gimbal;

FIGS. 2a, 2b, and 2c are partial views of the optical path showing in cross section the optical flexure joint when its element halves are, respectively, in alignment, out of alignment to the left, and out of alignment to the right; and FIG. 3 is an isometric view of a forward looking infrared device, including a direct view telescope, with portions broken away to show the incorporation of the gimbal mounted optical flexure joint in the optical path.

Referring to the drawing, the optical flexure joint or optical coupler 10 (FIGS. 2a, 2b, and 2c) of the present invention comprises a pair of lens doublets 12 and 14. Lens doublet 12 is negative and lens doublet 14 is positive. Lens doublet 12 (FIG. 3) is attached to the cross-elevation gimbal 16 by arms 18, and lens doublet 14 is attached to the pivotal point of elevational gimbal 20 across from lens doublet 12 by arms 22. The optical flexure joint 10 (FIGS. 2a, 2b, and 2c) has a central radius 24 common to both lens doublets 12 and 14, and the center of this radius is located at the center 26 of the proposed gimbal system (FIG. 3). Any rotation of lens doublet 12 with respect to lens doublet 14 forms a variable wedge or prism. This rotation may be in either direction as shown in FIGS. 2b and 2c. As the wedge is formed by rotation of one doublet half with respect to the other half and the optical deviation is exactly equal to the amount of wedge or rotation, no image motion results. The optical deviation angle of a homogeneous wedge is:

$$\text{Deviation angle} \approx (N-1)\theta$$

where $\theta$ = wedge angle; and

N = refractive index of wedge.

In order to make a wedge which has an optical deviation equal to the wedge angle a refractive index of 2.0 is required. No practical glasses have an exact index of 2.0. Thus, the optical flexure joint utilizes a pair of lens doublets each having two commercially available glasses having index of refractions between 1.4 and 1.9 which when combined produce the same power as if they were a single lens having an index of refraction of 2.0. In addition to this the types of glasses are chosen to produce an achromatic doublet. The different types of glass may be, for example, Schott Glass Company short crown (SF2), and lanthanum and flint (LAK10) glass which when placed in contact correct for chromatic aberration. A typical achromatic doublet lens element has a converging component (double convex) and a diverging component. For lens doublet 12 the converging component is of the lanthanum and crown glass and the diverging component is of the short flint glass; each has a 0.1 inch center thickness. The lens is designed to have the two surfaces that are in contact of the same curvature, i.e. 1.9307 inches, to simplify the cementing operation. For lens doublet 14 the diverging component is of the lanthanum and crown glass and the converging component is of the short flint glass; each component has a 0.1 inch center thickness and a radius of curvature of 1.955 inches.

In addition lens doublet half 12 has ∞ radius at surface 28 and a concave 7.503 inch radius at surface 30. While lens doublet 14 has ∞ radius at surface 32 and a convex 7.503 inch radius at surface 34. Surfaces 30 and 34 of the lens doublets 12 and 14 are spaced 0.0059 inches apart.

The optical flexure joint 10 is incorporated into an electro-optical/FLIR gimbal turret 36 (FIG. 3) in the optical path 38 to a direct view telescope 40 and direct view scanner. The telescope 40 and FLIR 42 are attached to the cross elevation gimbal 16. FLIR 42 may be that shown and described in U.S. Pat. No. 3,741,238 issued June 26, 1973. The optical path or relay 38 is from the telescope 40 or FLIR 42 whichever is selected by manipulating mirror 44. Mirror 44 is positioned at an angle 45° to the line of sight axis. Mirror 44 reflects the image through: lens doublet 14 which is mounted in elevation gimbal 20, lens doublet 12 which is mounted on cross-elevation gimbal 16 and lens 46 mounted in elevation gimbal 20 to prism 48 mounted in azimuth gimbal 50. Prism 48 reflects the image of the direct view telescope upwardly through lenses 52 and 54 to mirror 56. Lens assembly 52 and 54 are mounted in the vertical leg of the azimuth gimbal 50 and mirror 56 is mounted in the azimuth gimbal at an oblique angle to direct the image along the oblique member of the azimuth gimbal 50 to mirror 58. The mirror 58 is used to reflect the image to a prism 60 positioned at the center axis of the azimuth gimbal 50. Mirror 60 is positioned in the horizontal member of the azimuth gimbal 50 at an angle 45° to the impinging image for reflecting the image upwardly to mirror 62. Mirror 62 is attached to the stationary portion 64 of housing 66 at a 45° to the optical path axis for directing the image through tube 68 to a viewers eye piece (not shown).

Azimuth bearings 70 connect the stationary portion 64 of housing 66 to the rotating window portion 72 of housing 66 and azimuth gimbal 50. Azimuth gimbal 50 is formed to provide a tubular housing for the optical relay elements 48, 52, 54, 56, 58, and 60 previously mentioned. Azimuth gimbal 50 is pivotally connected to elevation gimbal 20 by pivots 74 positioned along the X axis, and elevational gimbal 20 is connected to the cross-elevational gimbal 16 by pivots 76 positioned along the Y axis.

In operation, the course gimbal, azimuth gimbal 50 and moving window, isolate the elevation gimbal 20 and the cross elevation gimbal 16 from outside forces such as wind. The cross-elevation gimbal 16 and elevation gimbal 20 provides increased stability for the FLIR 42 and its telescope 40. Relative movement between the cross-elevation gimbal 16 and elevation gimbal 18 is removed from the image by the optical flexure joint 10. Ray traces of the lens doublets 12 and 14 when acting as a wedge (FIGS. 2b and 2c) show an on-axis 1-sigma error of 0.03 milliradian for a 1-degree deviation, and no measureable degradation for 0-degree deviation. The flexible optical joint being located at the horizontal (X) axis is at a point in the optical relay where the equivalent eye resolution is 0.15 milliradian. Thus, the degradation caused by the optical flexure joint will be undiscernible to the operator.

Although only a single embodiment of this invention has been described herein, it will be apparent to a person skilled in the art that various modifications to the details of construction shown and described may be made without departing from the scope of this invention.

What is claimed is:
1. An optical flexure joint comprising:
(a) a housing, said housing including a stationary portion, a viewer tube connected to the stationary portion, and a rotating portion;
(b) an azimuth gimbal connected to the rotating portion of the housing, said azimuth gimbal having a tubular portion;
(c) a plurality of optical relay elements mounted in the tubular portion of the azimuth gimbal, said elements forming an optical path selectively through the azimuth gimbal to the viewer tube;
(d) an elevation gimbal including tubular pivots forming a horizontal axis, said pivots pivotally connecting the elevation gimbal and azimuth gimbal;
(e) a cross elevation gimbal including pivots forming a vertical axis, said pivots pivotally connecting the cross elevation gimbal to the elevation gimbal;
(f) a first lens doublet mounted in the elevation gimbal at its horizontal axis, and a second lens doublet mounted in the cross-elevation gimbal, said first and second lens doublets in a juxtapositional relationship; and
(g) a reflector mechanism for coupling to a sighting device, said reflector mechanism operative to reflect the image of the sighting device through the first and second lens doublets to the tubular portion of the azimuth gimbal, and through the relay elements of the azimuth gimbal to the viewer tube.

2. An optical flexure joint according to claim 1 wherein the first lens doublet mounted in the elevation gimbal is positive and the second lens doublet mounted in the cross elevation gimbal is negative whereby the power is substantially eliminated.

3. An optical flexure joint according to claim 1, wherein the rotating portion of the housing includes a window.

* * * * *